(12) United States Patent
Hooda et al.

(10) Patent No.: US 10,944,672 B2
(45) Date of Patent: Mar. 9, 2021

(54) MECHANISM AND PROCEDURES FOR MULTI-DOMAIN ENTERPRISE FABRIC DOMAIN FEDERATIONS

(71) Applicant: Cisco Technology, Inc., San Jose, CA (US)

(72) Inventors: Sanjay K. Hooda, Pleasanton, CA (US); Victor M. Moreno, Carlsbad, CA (US); Satish Kumar Kondalam, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/725,146

(22) Filed: Dec. 23, 2019

(65) Prior Publication Data

US 2020/0136968 A1 Apr. 30, 2020

Related U.S. Application Data

(63) Continuation of application No. 15/949,398, filed on Apr. 10, 2018, now Pat. No. 10,523,563.

(51) Int. Cl.
*H04L 12/741* (2013.01)
*H04L 12/933* (2013.01)
*H04L 12/715* (2013.01)

(52) U.S. Cl.
CPC .............. *H04L 45/74* (2013.01); *H04L 45/04* (2013.01); *H04L 45/64* (2013.01); *H04L 49/10* (2013.01); *H04L 2212/00* (2013.01)

(58) Field of Classification Search
CPC ......... H04L 45/74; H04L 45/04; H04L 45/64; H04L 49/10; H04L 2212/00
See application file for complete search history.

(56) References Cited

U.S. PATENT DOCUMENTS

| | | |
|---|---|---|
| 2012/0131142 A1 | 5/2012 | Flinck |
| 2012/0177049 A1 | 7/2012 | Xu et al. |
| 2012/0180122 A1 | 7/2012 | Yan et al. |
| 2013/0279508 A1 | 10/2013 | Kano |
| 2015/0188802 A1* | 7/2015 | Yoon ................ H04L 45/64 709/238 |
| 2016/0119196 A1 | 4/2016 | Comeras et al. |
| 2017/0208635 A1* | 7/2017 | Grootwassink ..... H04L 12/4633 |
| 2018/0041425 A1* | 2/2018 | Zhang ................ H04W 76/11 |
| 2018/0139133 A1 | 5/2018 | Makhijani et al. |

* cited by examiner

*Primary Examiner* — Duc C Ho
(74) *Attorney, Agent, or Firm* — Campbell Stephenson LLP

(57) ABSTRACT

In one embodiment, a method generally includes a first edge (E) node in a network receiving an encapsulated data packet, wherein the encapsulated data packet comprises an outer header and a data packet, wherein the outer header comprises a first router locator (RLOC) corresponding to the first E node, wherein the data packet comprises an internet protocol (IP) header, and wherein the IP header comprises a destination endpoint identification (EID) corresponding to a host H. The first E node determines whether the host H is attached to the first E node. And in response to the first E node determining the host is attached to the first E node, the first E node forwards the data packet to the host H. The first E node receives a message from another node after the host H detaches from the first E node and reattaches to another E node, wherein the message comprises the destination EID.

19 Claims, 12 Drawing Sheets

MECHANISM AND PROCEDURES FOR MULTI-DOMAIN ENTERPRISE FABRIC DOMAIN FEDERATIONS

CROSS-REFERENCE TO RELATED APPLICATIONS

The present patent application is a continuation of U.S. patent application Ser. No. 15/949,398, filed on Apr. 10, 2018, entitled "Mechanism and Procedures for Multi-Domain Enterprise Fabric Domain Federations" which is incorporated by reference herein in its entirety and for all purposes.

BACKGROUND

Network nodes may take the form of one or more routers, one or more bridges, one or more switches, one or more servers, or any other suitable communications processing device. The primary function of network nodes is to forward data packets towards their destination. A data packet is a formatted unit of data that typically contains control information and payload data. Control information may include information that identifies source addresses, destination addresses, error detection codes like checksums, sequencing information, etc. Control information is typically found in data packet headers and trailers. Payload data is typically located between the headers and trailers.

Operation of nodes within a network can be described in terms of a "control plane" and a "data plane." The data plane, also referred to as the "forwarding plane," does the actual forwarding of data packets received at a node. Data plane decisions may involve accessing a forwarding table that relates the appropriate control information (e.g., destination address) to the specific network interface, or egress interface, the data packet should be sent to in order to send it in the right direction. Generating such a forwarding table, based on a map, database, or other information reflecting the topology of the network, is a function of the control plane.

The control plane generates and updates its network topology information using one or more routing protocols. An interior gateway protocol (IGP) can be used for exchanging network topology information between nodes. An autonomous system, or routing domain, refers to a collection of interconnected network nodes under a common administration for purposes of network configuration. Exchange of routing information between autonomous systems can be done using an exterior gateway protocol such as Border Gateway Protocol (BGP).

BRIEF DESCRIPTION OF THE DRAWINGS

The present disclosure may be better understood, and its numerous objects, features and advantages made apparent to those skilled in the art, by referencing the accompanying drawings.

DESCRIPTION OF EXAMPLE EMBODIMENTS

Overview

In one embodiment, a method generally includes a first edge (E) node in a network receiving an encapsulated data packet, wherein the encapsulated data packet comprises an outer header and a data packet, wherein the outer header comprises a first router locator (RLOC) corresponding to the first E node, wherein the data packet comprises an internet protocol (IP) header, and wherein the IP header comprises a destination endpoint identification (EID) corresponding to a host H. The first E node determines whether the host H is attached to the first E node. And in response to the first E node determining the host is attached to the first E node, the first E node forwards the data packet to the host H. The first E node receives a message from another node after the host H detaches from the first E node and reattaches to the other E node, wherein the message comprises the destination EID.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Software defined access (SDA) fabrics use virtual networks (overlay networks) running on physical networks (underlay networks). An underlay network includes physical nodes (e.g., routers, switches, etc.), which can establish IP connectivity through use of a routing protocol. An overlay network is created on top of the underlay network in order to create a virtualized network. Data plane traffic and control plane messaging can be contained within each virtualized network.

SDA fabrics implement virtualization by encapsulating host end-point ("host") traffic over IP data packets. Hosts include devices such as laptop computer systems, servers, etc. Overlay networks can run across all or a subset of the underlay physical nodes. Multiple overlay networks can run across the same underlay network to support multi-tenancy through virtualization.

Figure 1A:
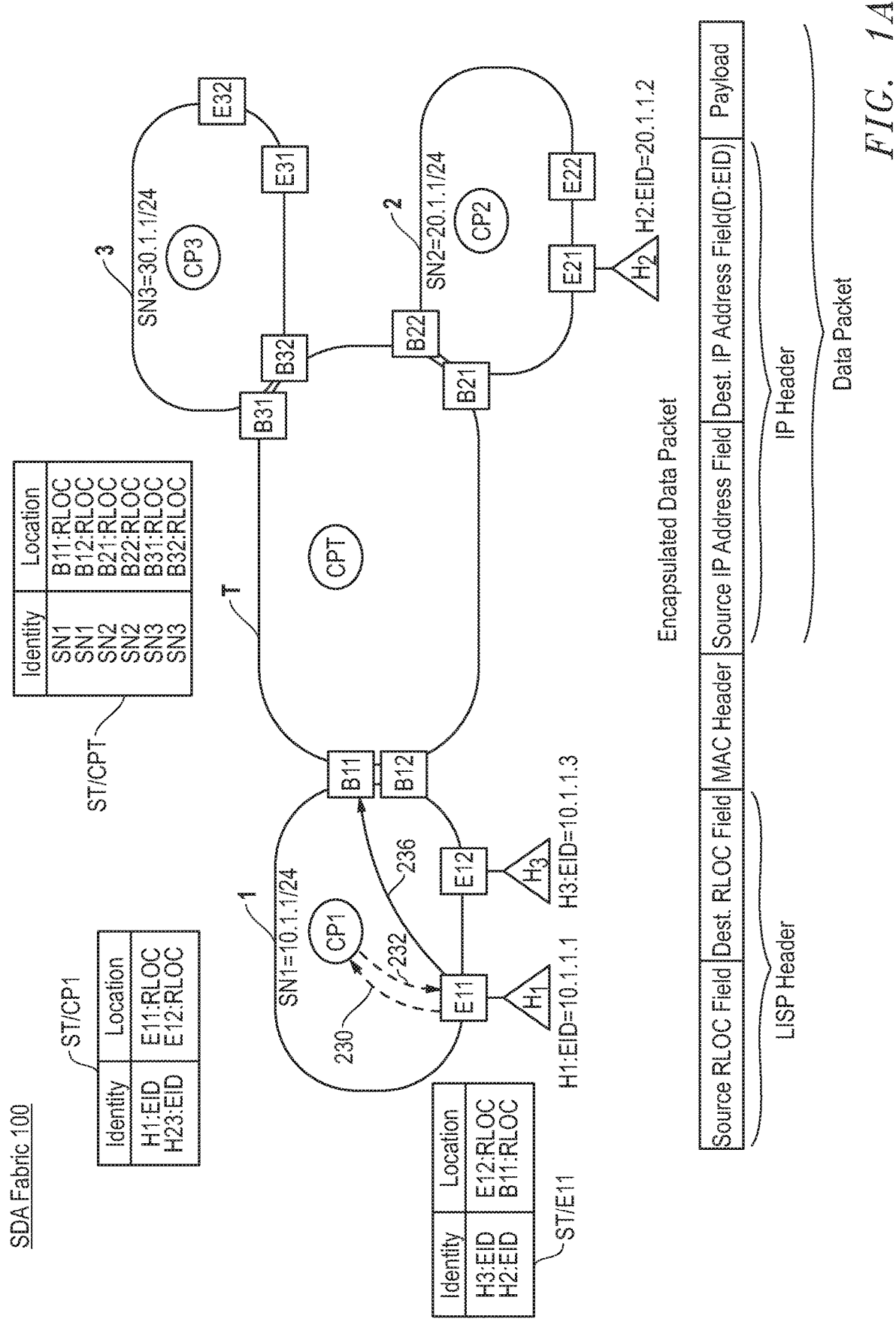
FIG. 1A is a simplified block diagram illustrating relevant aspects of a software defined access (SDA) fabric.

FIG. 1A illustrates an example SDA fabric 100 according to one embodiment of the present disclosure. SDA fabric 100 is segmented into local fabric sites. In the example embodiment, SDA fabric 100 includes local fabric sites 1, 2, and 3. These fabric sites are interconnected through a common fabric or transit (T) area. In principle each of the fabric sites 1-3 is autonomous from other fabric sites from a connectivity perspective, which means that each fabric site will be able to deliver connectivity for its hosts without any dependencies on other fabric sites. Autonomous connectivity can be provided with a complete set of functional nodes in each fabric site, and their operation as independent elements that federate to peer elements in other fabric sites, but do not depend on peer elements in other fabric sites for the completion of their functions. Each of the fabric sites has border nodes and a local control plan so that if external connectivity is lost, fabric site functionality continues. Each fabric site can enjoy the benefits of scale, resiliency, survivability and mobility. The overall aggregation of fabric sites can accommodate a very large number of hosts and can scale modularly or horizontally by aggregating fabric sites with state contained within each fabric site.

Each of the fabric sites 1-3 has its own control plane (CP) node, one or more border (B) nodes and one or more edge (E) nodes. In the illustrated example, each fabric site has two border nodes. The T area has a CP node. The T area shares at least one B node with each fabric site it interconnects. The T area does not have E nodes. Although not shown, intermediary nodes can provide connectivity between the CP, B and E nodes. Hosts such as host H1 can be attached to E nodes such as E11. When attached, a host can transmit data packets to or receive data packets from its edge node. A host can be a source or destination of data traffic. In other words a source host can transmit data packets to a destination host.

Traditional Internet routing and addressing architectures use a single namespace, the IP address, to simultaneously express two aspects about a device: its identity, and its location within a network. SDA fabric 100 will be described with use of Locator/ID Separation Protocol (LISP), it being understood the present invention should not be limited thereto. LISP creates two namespaces and uses two IP addresses: Endpoint Identifiers (EIDs), which are assigned to hosts, and Routing Locators (RLOCs), which are assigned to nodes. E nodes are assigned RLOCs, which in turn can be used to identify locations of hosts attached to the E nodes. Splitting EID and RLOC in this manner yields several advantages over traditional IP addressing. Internet Engineering Task Force (IETF), Request for Comments: 6830, "The Locator/ID Separation Protocol (LISP)," D. Farinacci, January 2013 and; IETF, Request for Comments: 6833 "Locator/ID Separation Protocol (LISP) Map-Server Interface," D. Farinacci, January 2013, both of which are incorporated herein by reference and describe several advantages of LISP.

E, B, and CP nodes have forwarding state tables and/or away tables in memory (e.g., cache memory). The state tables (or other functionally equivalent structures) can map identities (e.g., EIDs) to locations (e.g., RLOCs). E and B nodes can also hold away tables in memory. These away tables track hosts that have roamed away from their native fabric sites as will be more fully described below.

In general an E node can function as an ingress E node or an egress E node. An E node functions as an ingress when it receives a data packet from an attached host H. FIG. 1A illustrates relevant components of data packet, which includes a source IP address field, a destination IP address field, and a payload. Other components of the data packet are not shown. Destination EIDs (D:EIDs) are included in the IP destination field. The E node checks its state table ST/E for an entry that maps the destination EID to an RLOC. If a mapping is found, the E node encapsulates the data packet with an outer LISP header that includes the mapped RLOC, and the E node forwards the encapsulated data packet towards the node (e.g., an E node or a B node) that is assigned the RLOC. FIG. 1A illustrates relevant components of an encapsulated data packet, which includes a source RLOC field, a destination RLOC field and the data packet. An E node can receive an encapsulated data packet with an RLOC in its destination field, which is assigned to the E node. If the destination EID of the data packet matches the EID of a host H attached to the E node, the E node decapsulates the data packet (e.g., removes the outer LISP header) and forwards it to the host.

CP nodes have state tables. A CP node state table ST/CP should only hold mappings (e.g., EID-to-RLOC mappings) that are relevant to hosts that are attached to E nodes within the CP node's fabric site; it should not hold EID-to-RLOC mappings for hosts in other fabric sites. This feature allows the fabric site to be independent of other fabric sites, thus enhancing scalability of SDA fabric 100.

An E node immediately registers a host H when it attaches. Registration is implemented by sending a map-registration message to the CP node. The map-registration contains the mapping H:EID-to-E:RLOC, where H:EID is the EID of the host H and E:RLOC is the RLOC of edge E. The CP node stores the H:EID-to-E:RLOC mapping as an entry in its state table ST/CP. FIG. 1A shows a state table ST/CP1 for CP1, which maps the EIDs for hosts H1 and H3 to the RLOCs for E nodes E11 and E12, respectively. Any host that isn't explicitly registered at the local CP node is assumed to be reachable through one of the fabric site's B nodes and the T area as will be more fully described below.

The CP node of the T area (hereinafter CPT node) has a state table ST/CPT, which can map subnet prefixes for all fabric sites to which the CPT is connected. B nodes can register the subnet prefixes for their fabric sites. FIG. 1A shows a state table ST/CPT that maps fabric site subnet prefixes SN1-SN3 to RLOCs for respective B nodes. As will be more fully described below, hosts are mobile; a host H can detach from an E node in its native fabric site, and reattach to an E node in another fabric site. The term "visiting host" will refer to a host that has reattached to an E node of another fabric site. Normally the prefix-to-RLOC prefixes can be used to identify a native fabric site where a host can be found. The EID for a visiting host, however, may not properly fall within a subnet prefix registered with the CPT. In these cases B nodes register EIDs of the visiting hosts as will be more fully described below. As a result, state table ST/CPT will map EIDs of visiting hosts to RLOCs of B nodes that are connected to fabric sites where the visiting hosts have reattached.

As noted, E nodes receive data packets from attached source hosts. Data packets can be intra-fabric site forwarded or inter-fabric site forwarded to a destination host. Intra-fabric site forwarding refers to the scenario where both the source and destination hosts are local to the same site fabric. Another way to say this is that the EIDs for source and destination hosts are attached to respective E nodes of the same fabric site. Inter-fabric site forwarding refers to the scenario where the source and destination hosts are attached to respective E nodes in different fabric sites. Data packets traverse B nodes and the T area during inter-fabric site communication as will be more fully described below.

Nodes use their state tables STs to make data packet forwarding decisions. When an E node receives a data packet from an attached host H, the E node looks in its state table ST/E to see if it contains the destination EID, which is in the IP header of the data packet. If the state table maps the destination EID to an RLOC, the E node encapsulates the packet with an outer LISP header that includes the RLOC in the destination RLOC field, and the E node subsequently forwards the encapsulated packet towards the node assigned the RLOC, which can be another E node or a B node. If an entry for the destination EID does not exist in state table ST/E, the E node has no forwarding state for the received data packet. But the E node can send a map-request for the destination EID to the CP node. Assuming the destination host is attached to an E node in the same fabric site, the CP node should have a mapping between the destination EID and the RLOC of the E node to which the destination host is attached. If so the CP node replies to the E node's map-request with the RLOC mapping. The E node can update its state table ST/E by adding the received mapping. On the other hand, if the CP node lacks an RLOC for the destination EID, the CP node sends a negative map reply to the E node. Any host H that isn't explicitly registered with the local CP node, is assumed reachable via a B node. In response to receiving the negative reply, the E node can map the destination EID to a known RLOC for a B node in its fabric site. Ultimately, the E node can encapsulate the packet with an outer LISP header that includes the RLOC of the B node, and then the E node forwards the encapsulated packet to the B node. Additional packets received with the same destination EID will be encapsulated and forwarded by the E node using the same RLOC.

B nodes receive encapsulated data packets from an E node or from another B node. B nodes forward packets they receive to E nodes in their fabric site or to B nodes of other fabric sites. Each B node maintains a state table ST/B in memory that maps identities (e.g., EIDs) to locations (RLOCs). The B node uses its ST/B to make data packet forwarding decisions. When a B node receives an encapsulated data packet, the B node performs a lookup in its state table using the data packet's destination EID. If the state table contains an entry that maps the destination EID to an RLOC, the B node re-encapsulates the packet with an outer LISP header that includes the RLOC, and the B node subsequently forwards the recapsulated packet towards the RLOC. If the state table ST/B lacks an entry for the destination EID, the B node has no forwarding state for the received data packet. In this case the B node can implement one of several methods to identify the RLOC where the data packet is to be forwarded as will more fully described below.

FIGS. 2-7 are flowcharts of methods illustrating various actions performed in connection with embodiments of the nodes, systems and techniques disclosed herein. As will also be appreciated in light of the present disclosure, these methods may be modified in order to derive alternative embodiments. Moreover, although the steps in the flow charts are shown in a sequential order, certain steps may occur in a different order than shown, certain steps may be performed concurrently, certain steps may be combined with other steps, and certain steps may be omitted in other embodiments. The methods described can be performed by software modules or processors executing instructions stored in memory.

Figure 2:
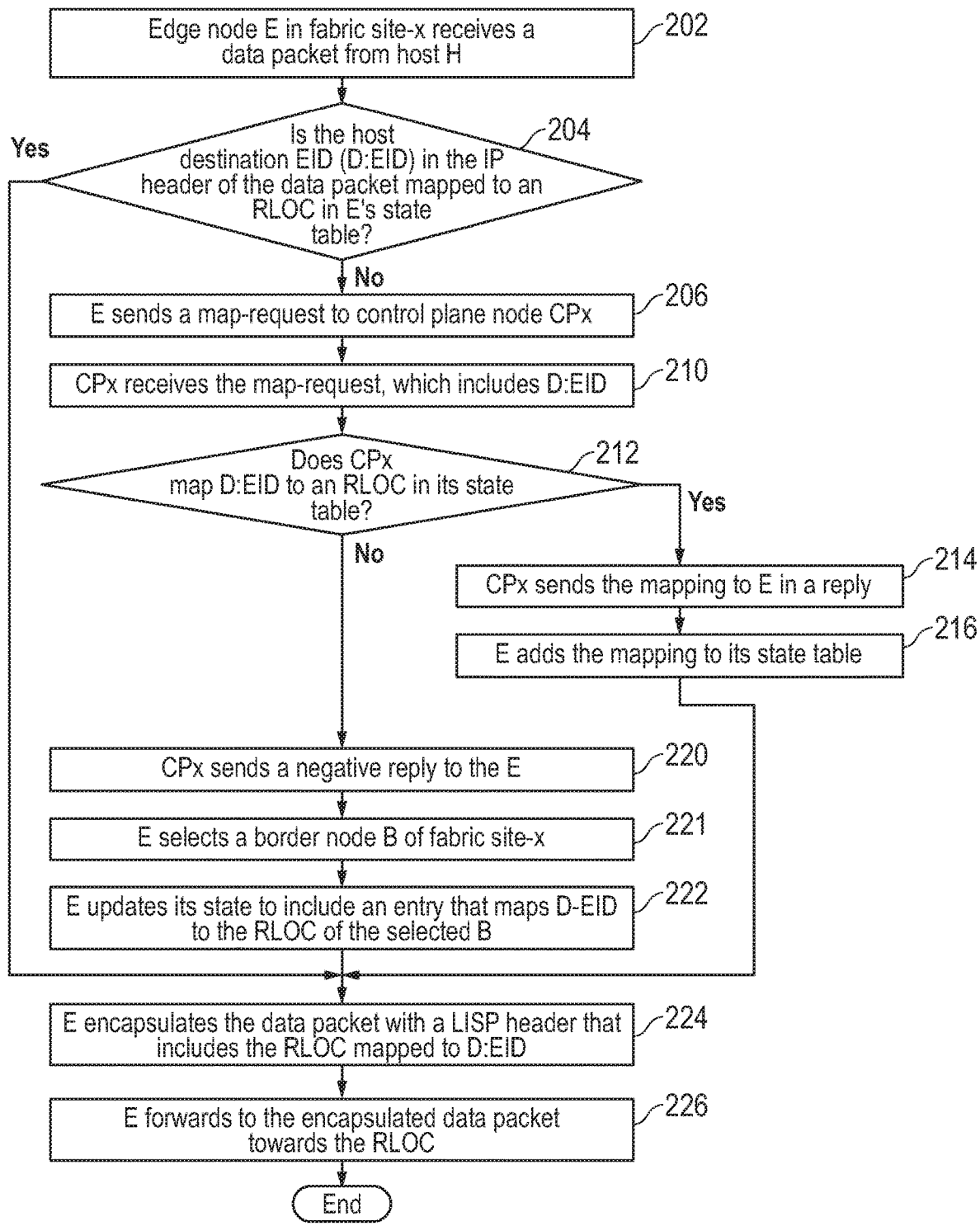
FIG. 2 is a flow chart illustrating relevant aspects of an example method implemented by an edge (E) node and a control plane (CP) node of the SDA fabric shown in FIG. 1A.

SDA fabric 100 can facilitate inter fabric communication or intra fabric communication between hosts. Either form begins when an E node in fabric site-x, where x is an integer, receives a data packet from an attached host H. The E node makes a forwarding decision based on a destination EID (i.e., D:EID) in the IP header of the data packet. FIG. 2 illustrates an example method implemented by an E node, which starts when E receives a data packet as shown in step 202 of FIG. 2. The E node accesses its state table ST/E using D:EID. More particularly, the E node looks in its state table to determine if it has an entry that maps D:EID to an RLOC. In an alternative embodiment, E node may also look in its state table to determine whether it has an entry that maps a non-LISP prefix (more fully described below) that covers D:EID. It is noted that when a D:EID falls within a non-LISP prefix, technically it is not an EID as defined in LISP. Although it is not a LISP-EID, the remaining disclosure will refer to it as an End-Point-Identifier (non-LISP).

The state table ST/E may or may not have an entry for the D:EID, or the state table ST/E may or may not have an entry with a non-LISP prefix that covers D:EID. If the E node previously received and forwarded a data packet with the same D:EID in its IP header, ST/E node should have a mapping for D:EID or a non-LISP prefix that covers D:EID. If the state table lacks such a mapping, the E node can ask CPx for help. To that end edge E node sends a map-request for D:EID to CPx in step 206. In response to the request, CPx looks in its state table ST/CPx to see if D:EID is mapped to an RLOC. If D:EID identifies a host that is attached to an edge node of fabric site-x, the state table should have a mapping for D:EID. If the state table lacks a mapping for D:EID, CPx sends a negative reply to the E node as shown in step 220. This negative reply suggests the destination host is attached to an E node in another fabric site, which can be reached via a B node. CPx may also calculate the longest covering non-LISP prefix for D: EID when ST/CPx lacks a mapping for D:EID. CPx can look at its configured prefixes, and if D:EID does not fall within any of those prefixes, CPx can use a standard algorithm to find the longest prefix match that excludes the configured prefixes. An IP table parsing method such as Patricia Tree crawling can be used to find the longest prefix. If the D:EID is within one of the configured prefixes but it isn't registered, then the longest covering prefix may be the host entry corresponding to the D:EID and the D:EID only (a host route) and it is used in the response with a very short TTL as the D:EID may very well be registered in the near future and the system could query for the D:EID again relatively quickly.

CPx can include the longest covering non-LISP prefix in the negative reply sent in step 220. In step 221, the E node selects one of its B nodes (e.g., B11 or B12). In one embodiment, the selection can be made by hashing D:EID. In step 222, the E node updates its state table by mapping D:EID to the RLOC of the selected B node. In an alternative embodiment, E node may update its state table by mapping the covering non-LISP prefix to the RLOC of the selected B node. If, on the other hand, state table ST/CPx does have a mapping for D:EID, then CPx replies with the mapping as shown in step 214. The E node receives and stores the mapping of the reply in its state table ST/E. Ultimately, the E node encapsulates the data packet received in step 202 with an outer LISP heading that contains the RLOC, which is mapped to the D:EID in ST/E as shown in step 224. In an alternative embodiment, E node encapsulates the data packet with an outer LISP heading that contains the RLOC, which is mapped to the non-LISP prefix that covers D: EID. The RLOC is placed in the destination RLOC field of the outer LISP header. The E node should also add its RLOC (E:RLOC) to the source RLOC field of the outer LISP header. Thereafter, the E node forwards the encapsulated data packet toward the RLOC.

To place the method shown in FIG. 2 in context with respect to inter fabric site communication and with continuing reference to FIG. 1A, presume that host H1 in fabric site-1 seeks to send data packets to host H2, which is native to fabric site-2. Presume also that edge node E11, to which H1 is attached, lacks an entry in its state table ST/E11 for the EID of host H2 (H2:EID) when the first data packet is received. In accordance with step 206, edge node E11 sends a map-request for H2:EID to CP1 along path 230. Message paths, such as the message path 230 for the map-request, are shown in lines. Since host H2 is not attached to fabric site-1, state table ST/CP1 will lack a mapping for H2:EID, and as a result CP1 responds by sending a negative reply to edge node E11 along path 232. In response, edge node E11 hashes H2:EID to yield a value. Based upon the hash value, edge node E11 selects border node B11 in accordance with implementing step 221. Additionally, edge node E11 updates it state table by mapping H2:EID to the RLOC of B11 (i.e., B11:RLOC). FIG. 1A shows state table ST/E11, which includes the mapping (i.e., H2:EID—B11:RLOC) added by E11 in accordance with step 222. Edge node E11 encapsulates the first data packet, and all subsequent data packets destined for H2, with an outer LISP header, the source and destination fields of which are set to E11:RLOC and B11:RLOC, respectively. E11 forwards the encapsulated data packet towards B11:RLOC along path 236. Data paths, such as the data path 236 for the encapsulated data packet, are shown in lines.

Border nodes are essential to inter fabric site communication. Before they participate in this, border nodes register the prefixes of their fabric sites with the T area control plane node CPT. The use of the prefixes will be more fully described below. In one embodiment, each border node sends a prefix-registration to CPT, which includes a fabric site prefix (e.g., SN1=10.1.1/24) mapped to the border node's RLOC (e.g., B11:RLOC). CPT stores these mappings in its state table ST/CPT. FIG. 1A illustrates an example ST/CPT, which includes fabric site prefixes mapped to respective border node RLOCs. Unlike ST/CPx, ST/CPT can also store mappings for hosts that are visiting foreign fabric sites. This last feature of ST/CPT enables communication with visiting hosts as will be more fully described below.

Border nodes receive encapsulated data packets either from the T area or from nodes in their fabric sites during inter fabric site communication. The encapsulated data packet includes an outer LISP header with a destination field that contains an RLOC assigned to the receiving B node. Border nodes re-encapsulate the data packets they receive with new outer LISP headers prior to packet forwarding. The new outer LISP header includes a new RLOC in the destination field. When a border node receives an encapsulated data packet from the T area, the destination field of the new outer LISP should include an RLOC for an edge node. When a border node receives an encapsulated data packet from its fabric site, the destination field of the new outer LISP should include an RLOC for a border node of another fabric site. The RLOCs for the destination field can be selected from the border node's state table based on the destination EID in the IP header of the data packet as will be more fully described below.

Figure 3:
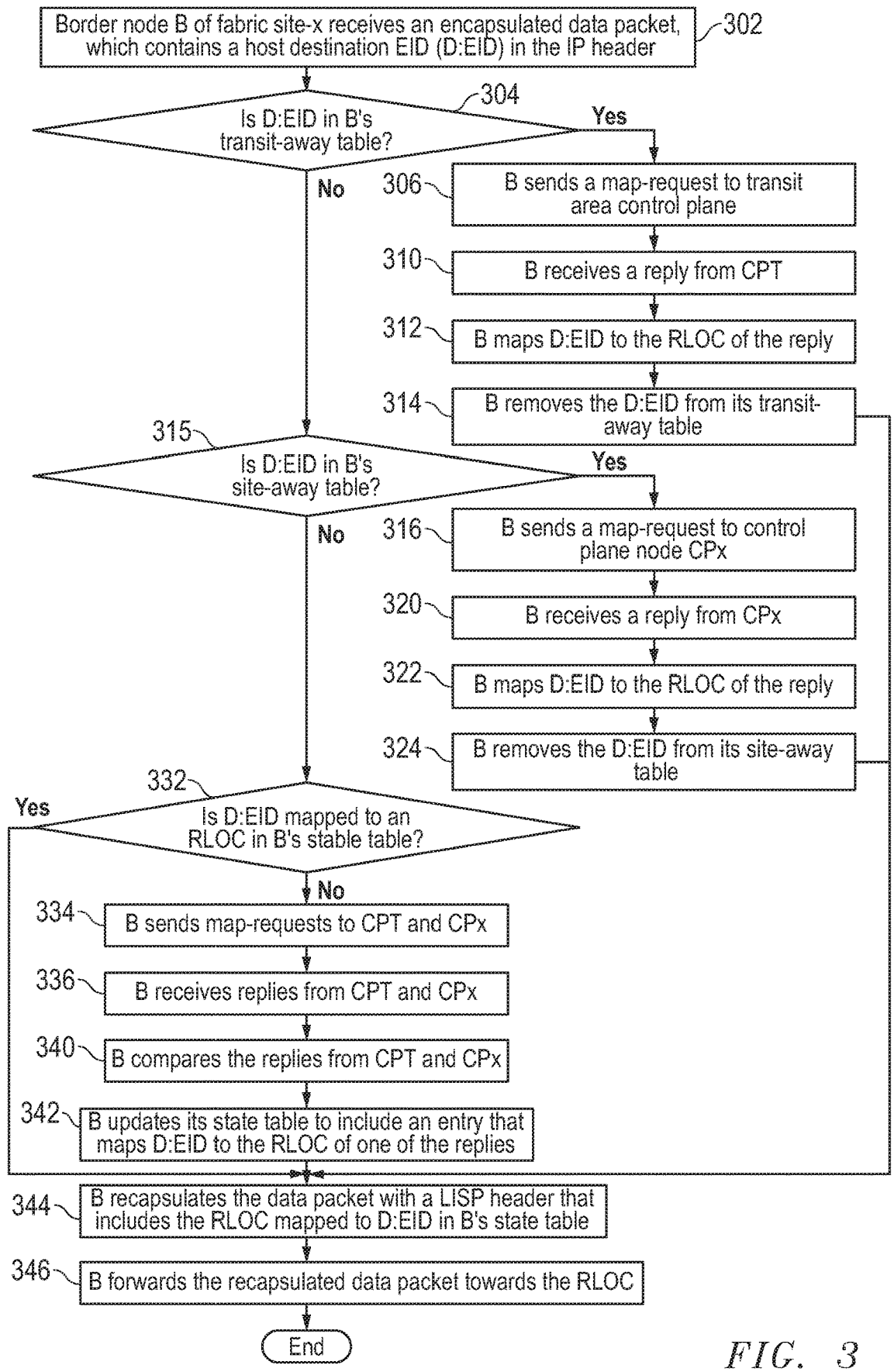
FIG. 3 is a flow chart illustrating relevant aspects of an example method implemented by a border (B) node of the SDA fabric shown in FIG. 1B.
Figure 4:
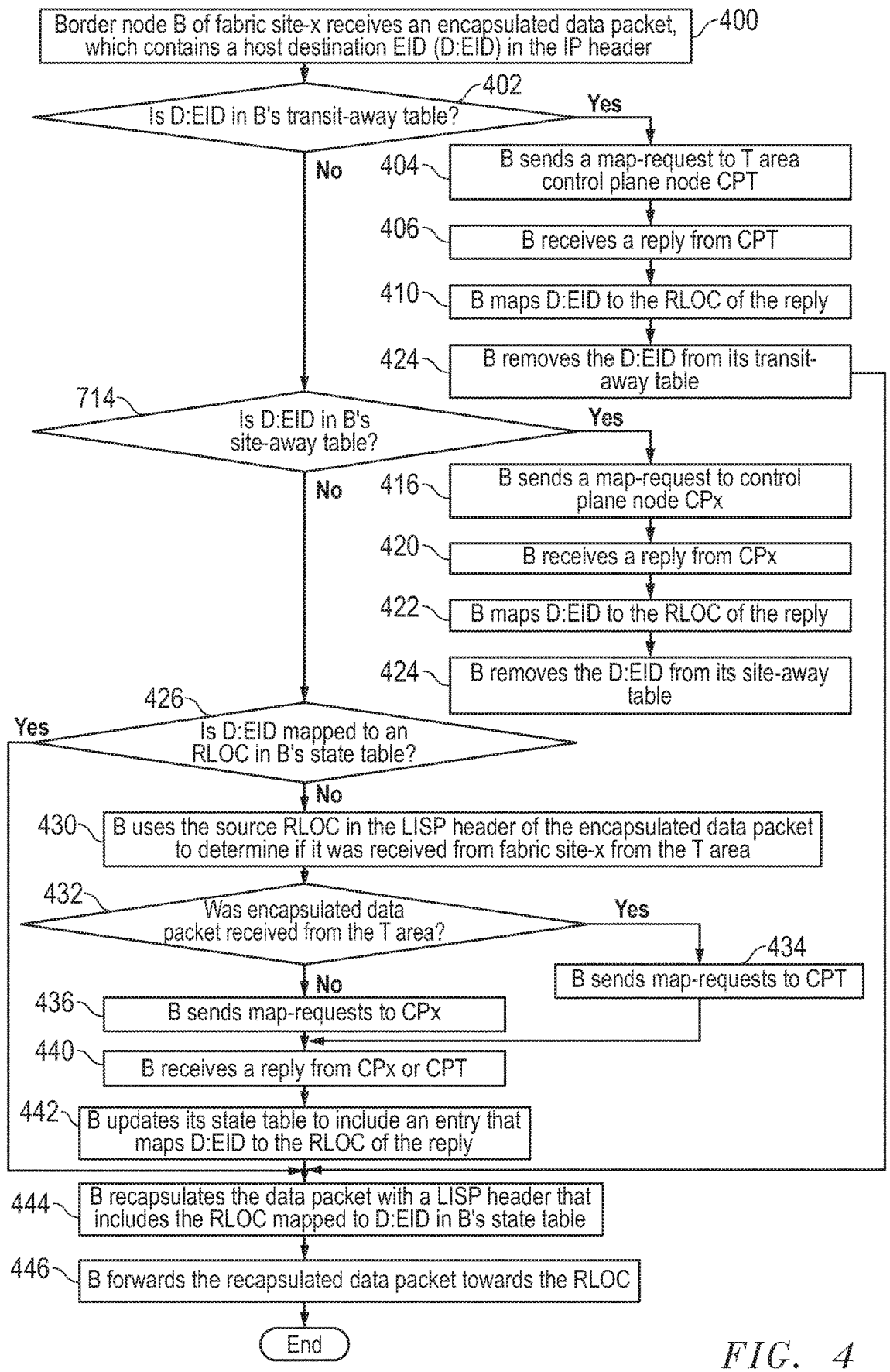
FIG. 4 is a flow chart illustrating relevant aspects of another example method implemented by a B node of the SDA fabric.
Figure 5:
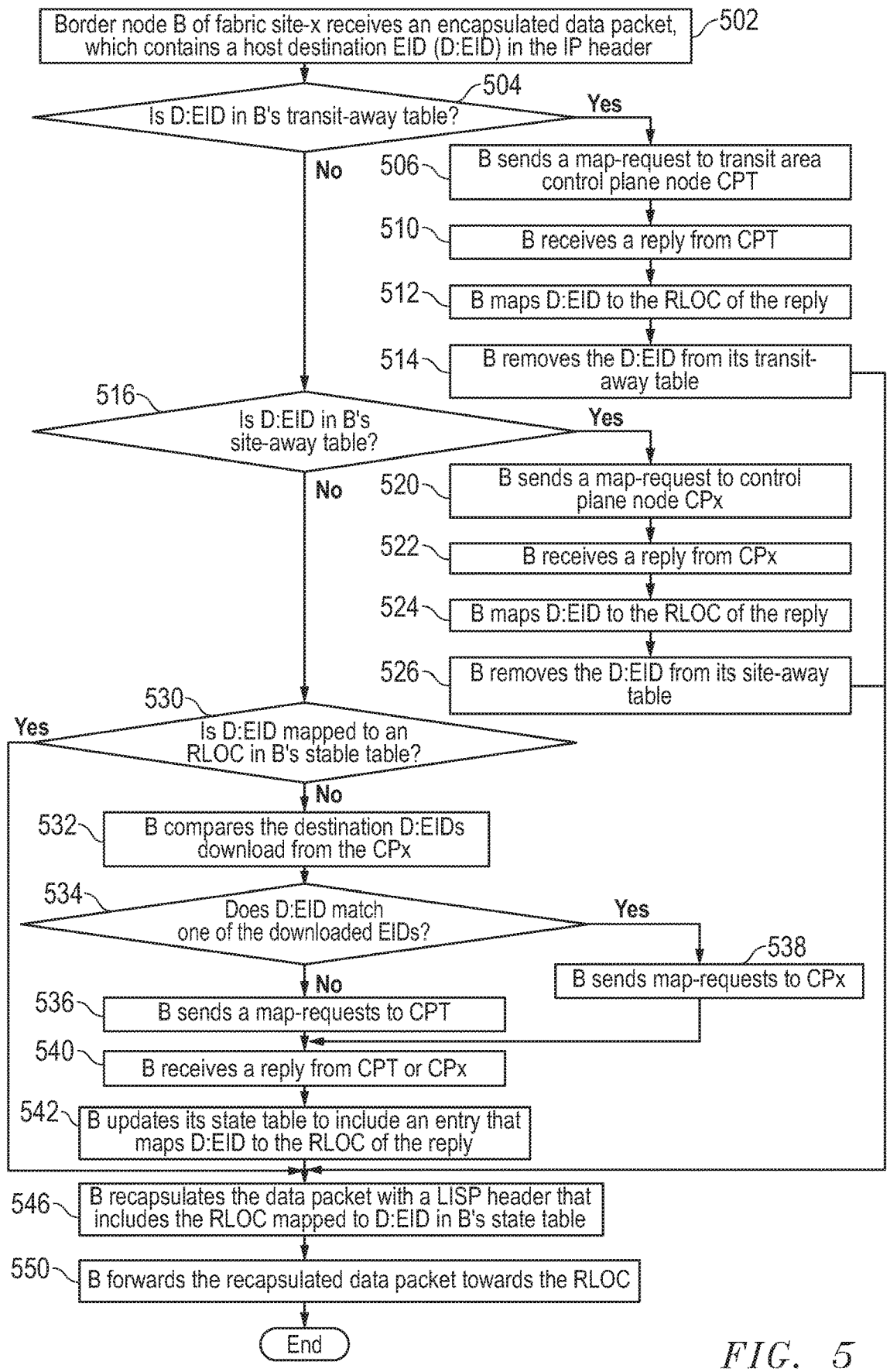
FIG. 5 is a flow chart illustrating relevant aspects of yet another example method implemented by a B node of the SDA fabric.

Border nodes maintain state tables STs in memory. Border nodes optionally maintain away tables ATs in memory. The away tables ATs track hosts that have reattached to an E node of a foreign fabric site. This concept will be more fully described below. The border node state tables STs map EIDs to RLOCs. The border node state tables are used to make packet forwarding decisions as mentioned above. A border node can implement any one of several different packet forwarding methods. FIGS. 3-5 illustrate alternative example methods and will be explained in turn.

The method of FIG. 3 starts when a border node B of fabric site-x receives an encapsulated data packet. The data packet contains the destination host EID (i.e., D:EID) in the destination field of the IP header. In one embodiment border node B checks its site-away table SAT/B and/or its transit-away table TAT/B to see if D:EID is contained therein. These steps, which will be further described below, facilitate communication with hosts that are visiting fabric sites if implemented. The remaining disclosure will presume border nodes maintain site-away tables SAT/Bs and/or transit-away table TAT/Bs, and that the border nodes check these tables upon receiving an encapsulated data packet. However, FIGS. 3-5 will be explained first with the assumption that neither the site-away table nor the transit-away table of B contains D:EID. Accordingly, border node B proceeds to check its state table ST/B to see if it contains a mapping for D:EID as shown in step 332. If this state table lacks the mapping, which should be the case if B did not previously receive a data packet with D:EID in its IP header, border node B sends separate map-requests to CPT and to CPx as shown in step 334. Each of these map-requests seeks an RLOC mapped to D:EID. In response to receiving a map-request CPT checks its state table ST/CPT to see if it contains a mapping with an EID that matches D:EID. If a mapping is found, CPT replies to the map-request by sending the RLOC mapped to D:EID. As an aside, a border node B can register a visiting host's EID with the ST/CPT in a process more fully described below. This process can result in ST/CPT having an entry that maps D:EID to an RLOC for a B node. For purposes of illustration, FIGS. 3-5 will be first explained with the assumption that ST/CPT lacks D:EID.

ST/CPT should contain a fabric site prefix that covers D:EID. CPT compares D:EID with the prefixes in its state table ST/CPT in order to identify one that covers D:EID. CPT responds to the map-request by sending a reply that contains the RLOC mapped to the covering prefix. To be clear, the reply from CPT should not include a prefix mapped to an RLOC if ST/CPT has an entry with the more specific identity (i.e., D:EID).

CPx also receives a map-request from B that includes D:EID. CPx looks in its state table ST/CPx to see if it contains a mapping for D:EID. If ST/CPx lacks D:EID, CPx will send a negative reply to node B. If ST/CPx contains a mapping, CPx will respond by sending a reply that contains the RLOC mapped to D:EID.

In step 336, B receives replies from CPT and CPx. B compares the replies and updates its state table ST/B as shown in steps 340 and 342. For example, in step 342 B will update ST/B by adding the mapping from CPT if the reply from CPx is negative. Or B will update ST/B by adding the mapping from CPx if the reply from CPx contains a mapping for D:EID and if the reply from CPT contains a mapping for a prefix covering D:EID. Ultimately in step 344, B looks in its state table ST/B to find the RLOC mapped to D:EID, and then B re-encapsulates the data packet with an outer LISP header that contains the RLOC.

Figure 1B:
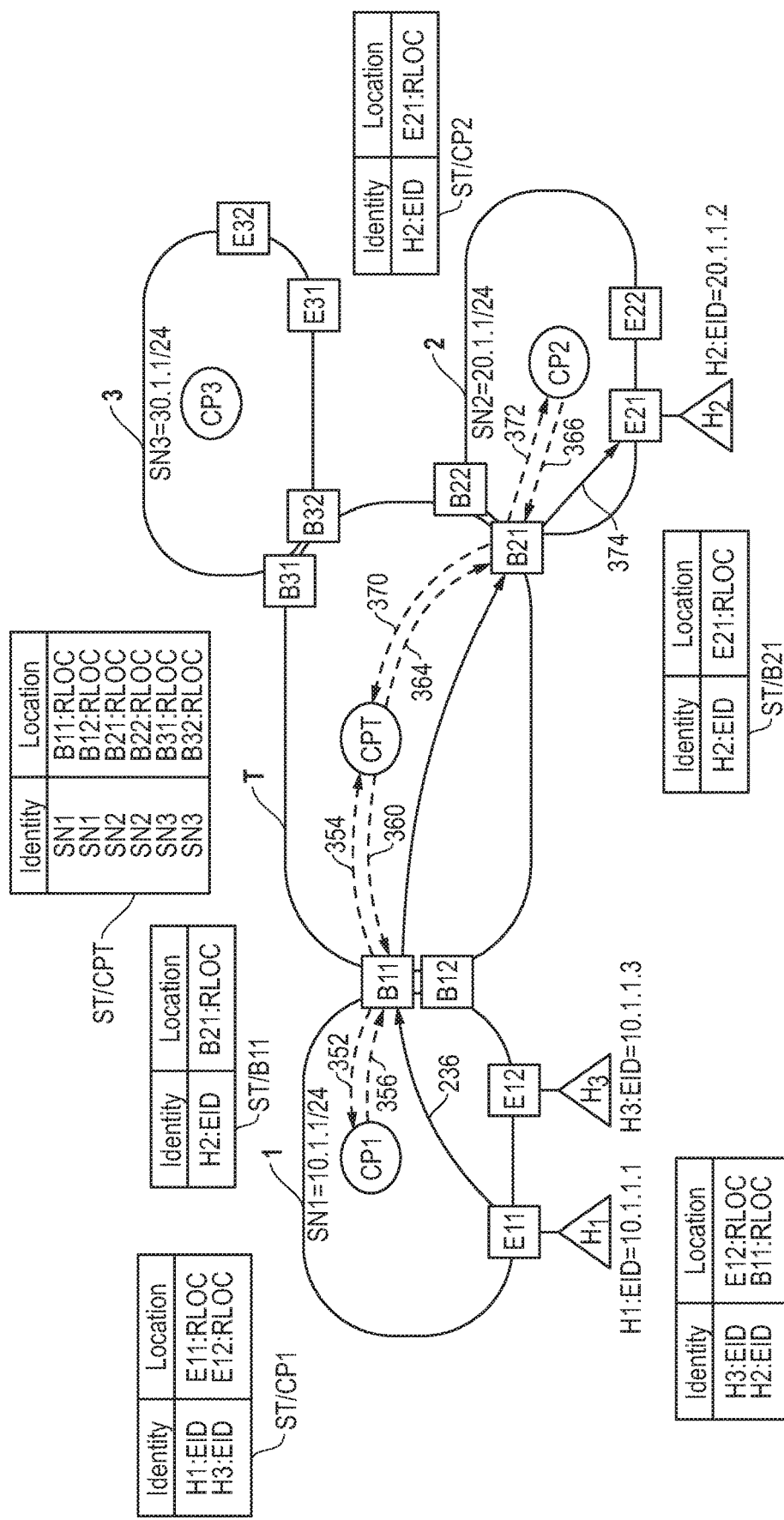
FIG. 1B is a simplified block diagram illustrating relevant aspects of the example SDA fabric.

FIG. 1B shows the SDA fabric 100 of FIG. 1A. With reference to FIG. 1B, the method of FIG. 3 can be placed into context by considering the example above in which border node B11 receives the encapsulated data packet from edge node E11 via path 236. The destination field in the IP header of the data packet contains the EID for host H2 (i.e., H2:EID=20.1.1.2/34). For purposes of explanation, it will be presumed that ST/B11 does not have a mapping for H2:EID, and as a result B11 sends map-requests to CP1 and CPT along paths 352 and 354 shown within FIG. 1B in accordance with step 334. CP1 will send a negative reply to B11 along path 356 since ST/CP1 lacks a mapping for H2:EID. It will also be presumed that CPT lacks H2:EID within its state table ST/CPT. However, ST/CPT includes an entry in which fabric site prefix SN2=20.1.1/24 covers H2:EID=20.1.1.2/34. Accordingly, CPT responds to the map-request by sending the reply back to border node B11 along path 360. This reply maps prefix SN2 to the RLOC for one of border node B21 or B22. CPT can use a hash of the destination EID to select one of border nodes B21 and B22. For purposes of explanation, it will be presumed that CPT's reply includes SN2 mapped to B21:RLOC, the RLOC for B21. In accordance with step 340 and 342, B11 adds an entry to its state table that maps SN2 to B21:RLOC. FIG. 1B shows state table ST/B11 after border node B11 adds the new entry. B11 re-encapsulates the data packet with a LISP header that includes B21:RLOC in the destination field thereof. FIG. 1B shows B11 sending the re-encapsulated data packet to border node B21 along path 362 in accordance with step 346.

Continuing with the illustrated example, border node B21 receives the encapsulated data packet from border node B11. Border node B21 can re-encapsulate and forward the data packet destined for host H2 using the method of FIG. 3. For purposes of explanation, it will be presumed that state table ST/B21 initially lacks the EID for host H2 (i.e., the H2:EID) when B21 receives the encapsulated packet from B11, and as a result border node B21 sends map-requests along paths 364 and 366 to CPT and CP2, respectively, in accordance with step 334. CPT and CP2 send replies back to B21 along paths 370 and 372. FIG. 1B shows state table ST/CP2, which contains a mapping for H2:EID, which indicates host H2 is attached to edge node E21. In the illustrated example, the reply from CP2 includes H2:EID mapped to E21:RLOC, the RLOC for edge node E21. This mapping will be more specific than the mapping received in the reply from CPT. Accordingly, border node B21 stores the mapping from CP2 in its state table ST/B21. FIG. 1B shows state table ST/B21 after border node B21 updates the state table in accordance with step 342. Thereafter B21 re-encapsulates the data packet with a new, outer LISP header that contains E21:RLOC. Border node B21 forwards the re-encapsulated data packet to E21 along path 374. Edge node E21 decapsulates the data packet, and forwards it to host node H2.

As noted, alternative methods can be employed by border nodes in response to receiving an encapsulated data packet. FIG. 4 illustrates one such alternative method, which begins at step 400 when a border node B of fabric site-x, receives an encapsulated data packet with D:EID. Border node B checks its site-away table and/or its transit-away table in steps 402 or 414 to see if D:EID is contained therein. For purposes of illustration, FIG. 4 is explained with the assumption that neither table contains D:EID. Accordingly, border node B proceeds to check its state table ST/B in accordance with step 426, to see if it contains a mapping for D:EID. If it does not, border node B uses the source RLOC (i.e., the RLOC in the source field of the outer LISP header) to determine if the data packet was received from fabric site-x or from the T area. If the B node determines the encapsulated data packet was received from fabric site-x, B sends a map-request for D:EID to CPT in step 434. CPT receives the request and looks in ST/CPT to see if it contains a mapping for D:EID. For purposes of initial explanation of FIG. 4, ST/CPT is presumed to lack an entry for D:EID. However, ST/CPT should contain a fabric site prefix that covers D:EID. CPT compares D:EID with the prefixes in state table ST/CPT to identify one that covers D:EID. Then CPT responds to the map-request by sending a reply that contains the identified RLOC-to-prefix mapping. On the other hand, if in step 430 border node B determines the encapsulated data packet was received from the T area, then B sends a map-request for D:EID to CPx in step 436. CPx receives the request and looks in ST/CPx to see if it contains a mapping for D:EID. If it does, CPx responds to the map-request by sending a reply that contains the RLOC-to-D:EID mapping. In response to either step 434 or 436, B updates ST/CPx by storing the mapping of the reply from CPx or CPT as shown in step 442. Ultimately in step 444, B looks in its state table ST/B and finds the RLOC mapped to D:EID. B re-encapsulates the data packet with an outer LISP header that contains the RLOC.

FIG. 5 illustrates yet another method that can be implemented by a border node B in fabric site-x. Before the method of FIG. 5 is implemented, node B downloads a list of EIDs that are registered at control plane node CPx. This downloaded list is updated by CPx at regularly scheduled intervals. At step 502 border node B receives an encapsulated data packet, which contains D:EID. Border node B checks it site-away and/or transit-away table in steps 504 or 516 to see if D:EID is contained therein. For purposes of explanation, FIG. 5 will be explained with the away tables lacking D:EID. Accordingly, the method proceeds to step 530 where B looks in its state table SAT/B to see if it contains a mapping for D:EID. Assuming no match is found, the method proceeds to step 532 where B compares D:EID with the list of EIDs downloaded from the CPx. If D:EID does not match one of the downloaded EIDs, B sends a map-request for D:EID to the CPT in step 536. CPT receives the request and looks in ST/CPT to see if it contains a mapping for D:EID. For purposes of initial explanation of the method in FIG. 5, ST/CPT is presumed to lack an entry for D:EID. However, ST/CPT should contain a fabric site prefix that covers D:EID. CPT compares D:EID with the prefixes in state table ST/CPT to identify one that covers D:EID. Then CPT responds to the map-request by sending a reply that contains the RLOC-to-covering prefix mapping. However, if border node B determines D:EID matches an EID in the downloaded list in step 534, then B sends a map-request for D:EID to CPx in step 538. CPx receives the request and looks in ST/CPx for D:EID. If ST/CPx contains a mapping with D:EID, CPx responds to the map-request it receives by sending a reply that contains the RLOC-to-D:EID mapping. In response to either step 536 or 538, B updates ST/CPx by storing the mapping of the reply from CPx or CPT as shown in step 542. Ultimately in step 546, B looks in its state table ST/B and identifies the RLOC mapped to D:EID. B re-encapsulates the data packet with an outer LISP header that contains the identified RLOC.

Figure 1C:
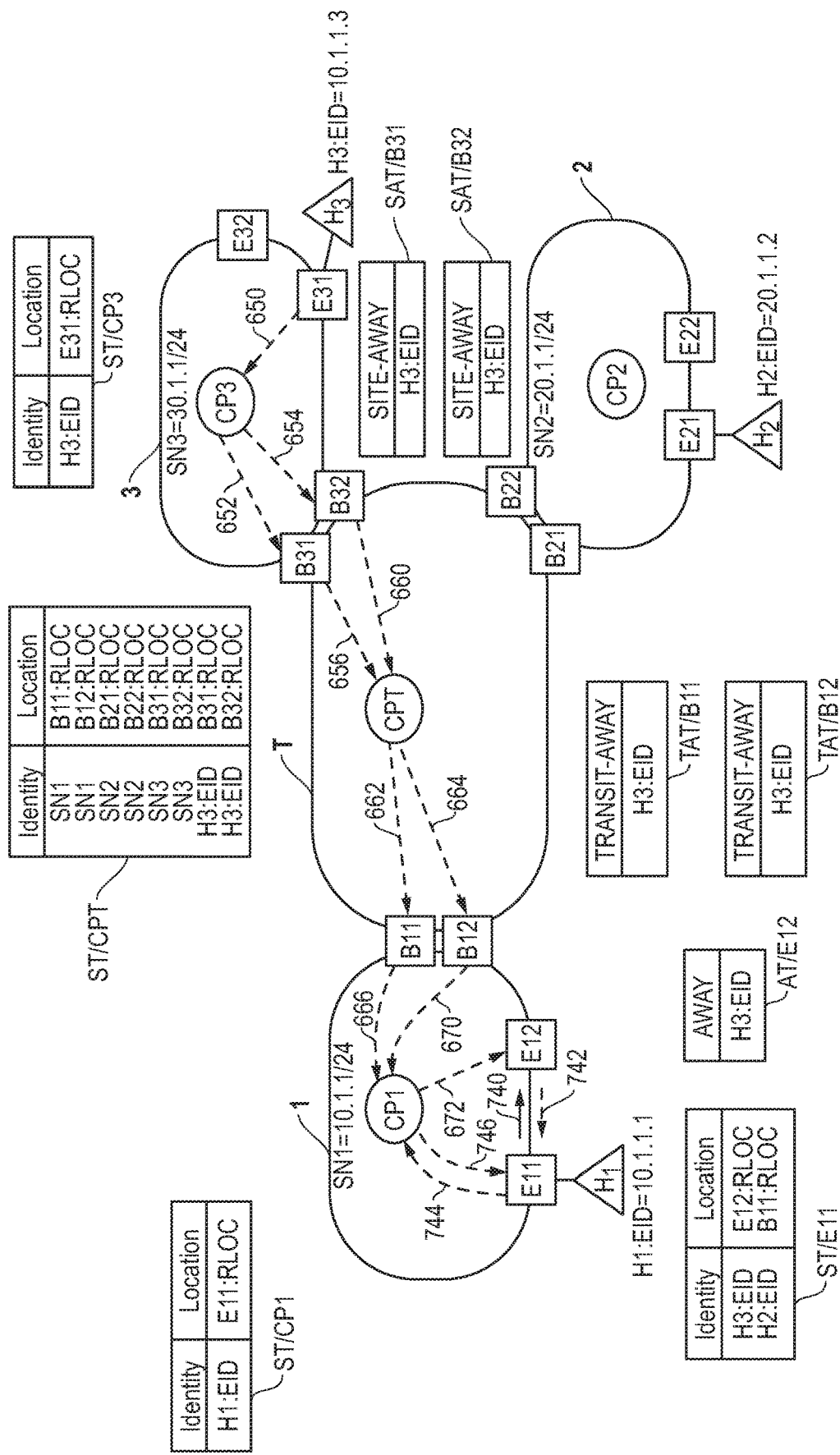
FIG. 1C is a simplified block diagram illustrating relevant aspects of the example SDA fabric.
Figure 6:
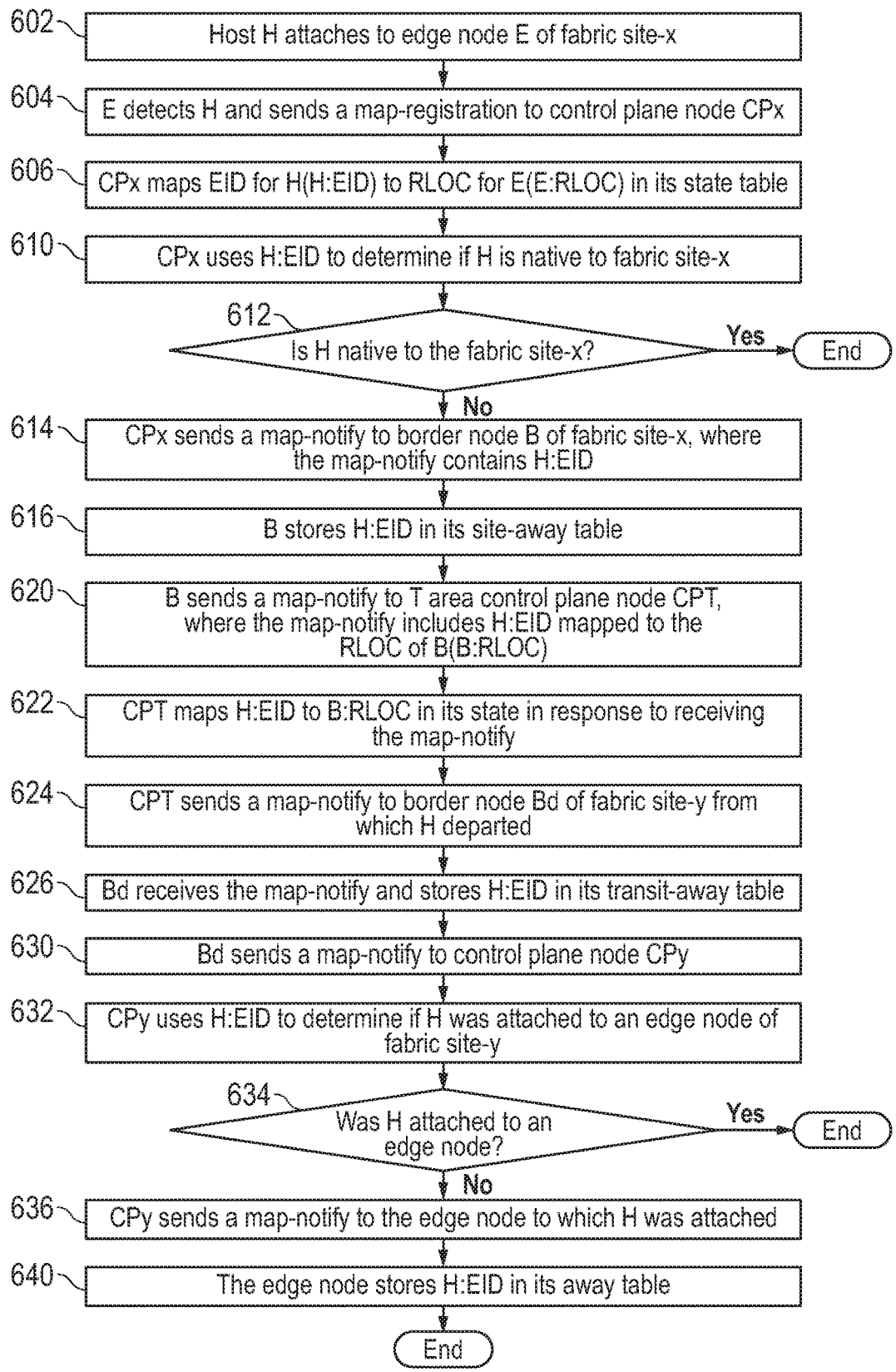
FIG. 6 is a flow chart illustrating relevant aspects of an example method implemented nodes of the SDA fabric shown in FIG. 1C when a host roams to a foreign fabric site.

SDA fabric 100 enables a host to move from one fabric site to another, and still receive inter-fabric site or intra-fabric site data traffic. FIG. 1C shows SDA fabric 100 of FIG. 1B after host H3 detaches from edge node E12 of fabric site-1 and reattaches to edge node E31 of fabric site-3. FIG. 6 illustrates a method implemented in SDA fabric 100 for updating away tables to inform SDA fabric 100 that a host H, like host H3, is visiting a foreign fabric site. The updated away tables enable packet forwarding to visiting hosts.

The method of FIG. 6 begins after host H attaches to edge node E of fabric site-x in step 602. E detects H and sends a map-registration to control plane node CPx in step 604. In response to receiving the map-registration, CPx stores the mapping in its state table ST/CPx. CPx uses H:EID from the map-registration to determine if host H is native to fabric site-x in step 612. In one embodiment, CPx can make this determination by comparing H:EID to the subnet prefix for fabric site-x. If the EID falls within the prefix, host H is native to fabric site-x, and the method of FIG. 6 ends. If not, host H is visiting and the method proceeds to step 614, the first step of propagating information throughout SDA fabric 100 about the location of visiting host H. More particularly, CPx sends map-notify messages to the border nodes of fabric site-x. Each map-notify message includes H:EID, the visiting host EID. In response to receiving a map-notify, border node B adds H:EID to its site-away table SAT/B.

After H:EID is added to the site-away table of B in step 616, node B sends a map-notify message to CPT in step 620. This map-notify message includes a mapping between H:EID and B:RLOC, the ROLC of node B. CPT adds the mapping to its state table ST/CPT in step 622. CPT then sends a map-notify message to each of the border nodes Bd of fabric site-y, the native fabric site for visiting host H. CPT can identify Bd using H:EID and known prefixes for the fabric sites. In one embodiment, CPT can compare H:EID with the prefixes in ST/CPT to identify the fabric site subnet prefix that covers H:EID. CPT sends a map-notify message to each border node Bd that is mapped via its RLOC to the identified prefix. The map-notify identifies H:EID.

Border node Bd will update its transit-away table TAT/Bd by adding H:EID contained in the map-notify it receives in accordance with step 626. Bd also sends a map-notify to its control plane node CPy in step 630. This map-notify identifies H:EID. CPy looks in its state table ST/CPy to see if H:EID is mapped therein. If not, the process ends. If H:EID is mapped in the state table to an RLOC of an edge node, CPy sends a map-notify to the edge node. This map-notify alerts the edge node that host H is no longer attached. CPy may also update its state table ST/CPy by removing the mapping that contains H:EID after CPy sends the map-notify in step 636. The edge node in fabric site-y adds H:EID to its away table AT/E in response to receiving the map-notify from CPy in step 640, and the process ends.

The process of FIG. 6 can be placed into context by considering the steps implemented after visiting host H3 reattaches to edge node E31. FIG. 1C shows edge node E31 sending a map-registration to CP3 along path 650. The map-registration contains a mapping between the EID for H3 (H3:EID) and the RLOC for E31 (E31:RLOC). FIG. 1C illustrates the state table ST/CP3 for CP3 after CP3 adds the mapping of the map-registration it receives. CP3 compares H3:EID=10.1.1.3/32 with SN3=30.1.1/24, the prefix for fabric site-3, and determines host H3 is visiting since SN3 does not cover H3:EID. In accordance with step 614, CP3 sends map-notify messages along paths 652 and 654 to border nodes B31 and B32. B31 and B32 update their site-away tables SAT/B31 and SAT/B32, respectively, by adding H3:EID in response to implementing step 616. FIG. 1C shows SAT/B31 and SAT/B32 after they are updated. B31 and B32 then send map-notify messages along paths 656 and 660 to CPT in response to implementing step 620.

These messages map H3:EID to the RLOCs for B31 and B32; the message sent by B31 maps H3:EID-to-B31:RLOC and the message sent by B32 maps H3:EID-to-B32:RLOC. CPT stores each of these mappings in its state table ST/CPT in accordance with step 622. FIG. 1C shows ST/CPT after it is updated. CPT compares H3:EID=10.1.1.3/32 with the subnet prefixes in ST/CPT to identify SN1=10.1.1/24 as the covering prefix. The identified covering prefix is mapped to the RLOCs for B11 and B12 in ST/CPT. In accordance with step 624 CPT sends map-notify messages along paths 662 and 664 to border nodes B11 and B12. In response to implementing step 626, B11 and B12 update their respective transit-away tables TAT/B11 and TAT/B12 by adding H3:EID. FIG. 1C shows TAT/B11 and TAT/B12 after the addition of H3:EID. Border nodes B11 and B12 send map-notify messages along paths 666 and 670 to control plane node CP1 in accordance with step 630. These map-notify messages identify H3:EID. CP1, in response, forwards at least one map-notify message along path 672 to edge node E12 after CP1 finds H3:EID mapped to E12:RLOC in state table ST/CP1. CP1 removes the mapping for H3:EID from ST/CP1 after forwarding the map-notify message to E12. In accordance with step 640, edge node E12 adds H3:EID to its away table AT/E12. FIG. 1C shows tables ST/CP1 and AT/E12 after they are updated by CP1 and E12, respectively.

Figure 7:
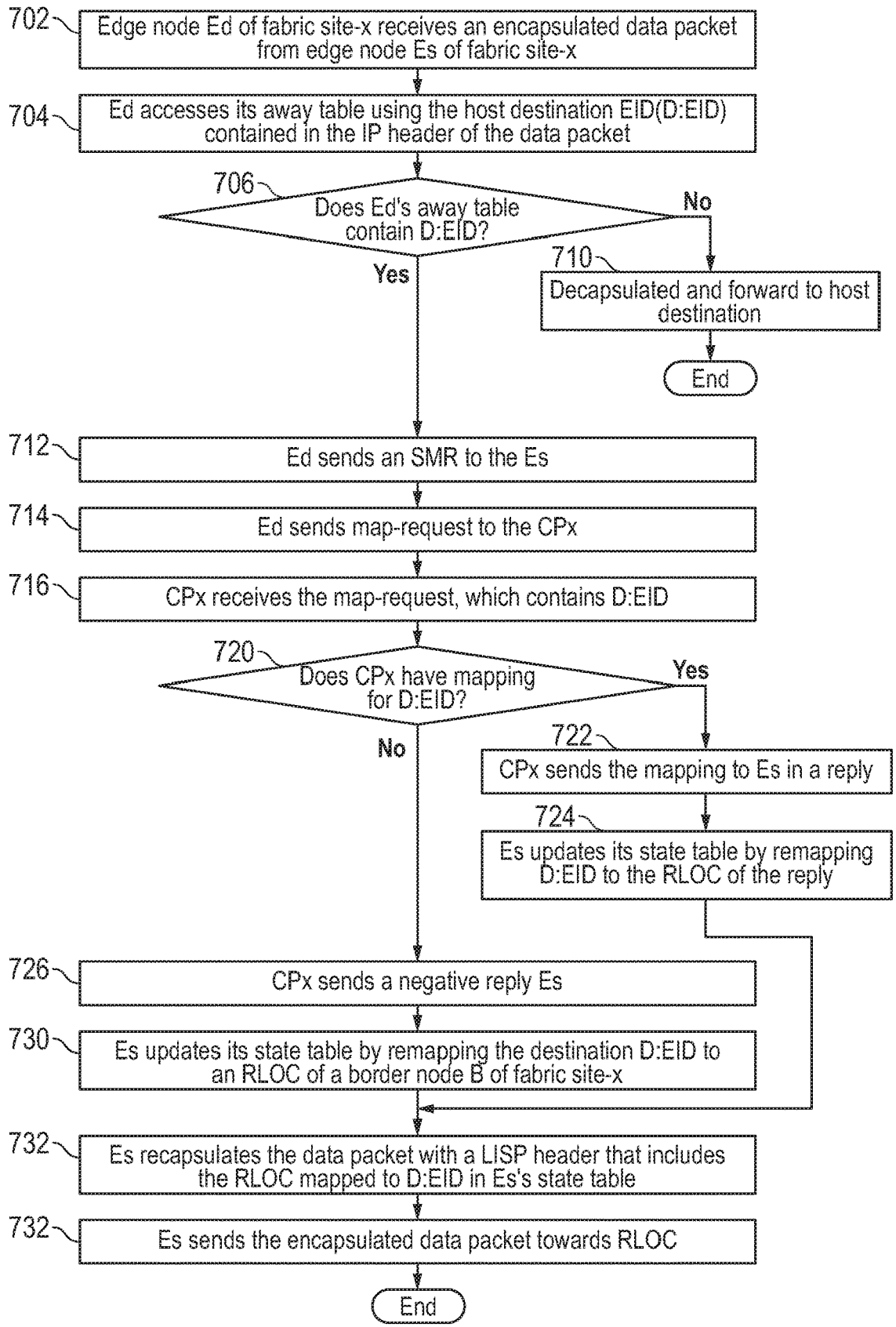
FIG. 7 is a flow chart illustrating relevant aspects of an example method implemented by nodes of the SDA fabric shown in FIG. 1D.

The away, site-away and transit-away tables track hosts that are visiting foreign fabric sites. Nodes can use these tables to facilitate communication to these hosts after they have reattached to edge nodes outside their native fabric site. FIG. 7 illustrates an example method employed by an edge node to facilitate communication with such a host. FIG. 7 begins after an edge node Ed, such as edge node E11, sends an encapsulated data packet towards a host H, such as host H3, which is visiting a foreign fabric site in the illustrated example. FIG. 1C illustrates edge node E11 sending an encapsulated data packet, which is destined for H3, to E12 along path 740. As seen in FIG. 1C, edge node E11 has a state table ST/E11, which has not been updated since host H3 moved to fabric site-2. In other words ST/E11 has an outdated entry that maps H3:EID, the destination EID for host H3, to RLOC:E12, the RLOC for edge node E12. As such, E11 unwittingly sends the encapsulated data packet towards edge node E12 along path 740.

With continuing reference to FIG. 7, edge node Ed (e.g., E12) of fabric site-x receives an encapsulated packet from a source edge node Es (e.g., E11) of the same fabric site-x in step 702. Ed looks to see if D:EID, the EID of the destination host, is contained in the away table AT/Ed. If not, the destination host should still be attached to Ed, and as a result Ed decapsulates and sends the data packet to the destination host as shown in step 710. However, if D:EID is found in AT/Ed, the host in question is no longer attached to Ed, but has reattached to another edge node possibly in another fabric site. In this situation, Ed sends a solicited map request (SMR) back to Es, the edge node that sent the encapsulated data packet of step 702. The SMR inform Es that the destination host in question is no longer attached to edge node Ed. Upon receipt of the SMR, Es sends a map-request for D:EID to CPx as shown in step 714. CPx receives the map-request, and looks in its state table ST/CPx for an entry that maps D:EID to an RLOC. ST/CPx should have a mapping for D:EID if the host in question has reattached to another edge node in same, native fabric site-x. If so, CPx sends the mapping to Es in a reply, and Es updates the mapping in its state table ST/E accordingly. Es re-encapsulates the data packet with an outer LISP header that includes the new RLOC received in the reply. The new RLOC corresponds to the edge node to which host H has reattached itself in fabric site-x, and the process ends. However, as was explained above with reference to step 640 in FIG. 6, CPx may have removed the entry in its state table that mapped an EID of a host, such as host H3, which has roamed to a foreign fabric site. If ST/CPx lacks a mapping for D:EID in step 720, CPx will send a negative reply for D:EID to Es as shown in step 726.

Es, in response to receiving the negative reply, updates is state table ST/Es by remapping D:EID to an RLOC of a border node B of fabric site-x. Es can choose from any one of several border nodes based on a hash of D:EID. In response to either updating state table ST/Es in step 724 or step 230, Es re-encapsulates the data packet with a new outer LISP header that contains the new RLOC in the destination RLOC field. The re-encapsulated data packet is forwarded towards the new RLOC. Any further data packets sent by Es to the remotely located destination host will be encapsulated with an outer layer that includes the new RLOC.

Figure 1D:
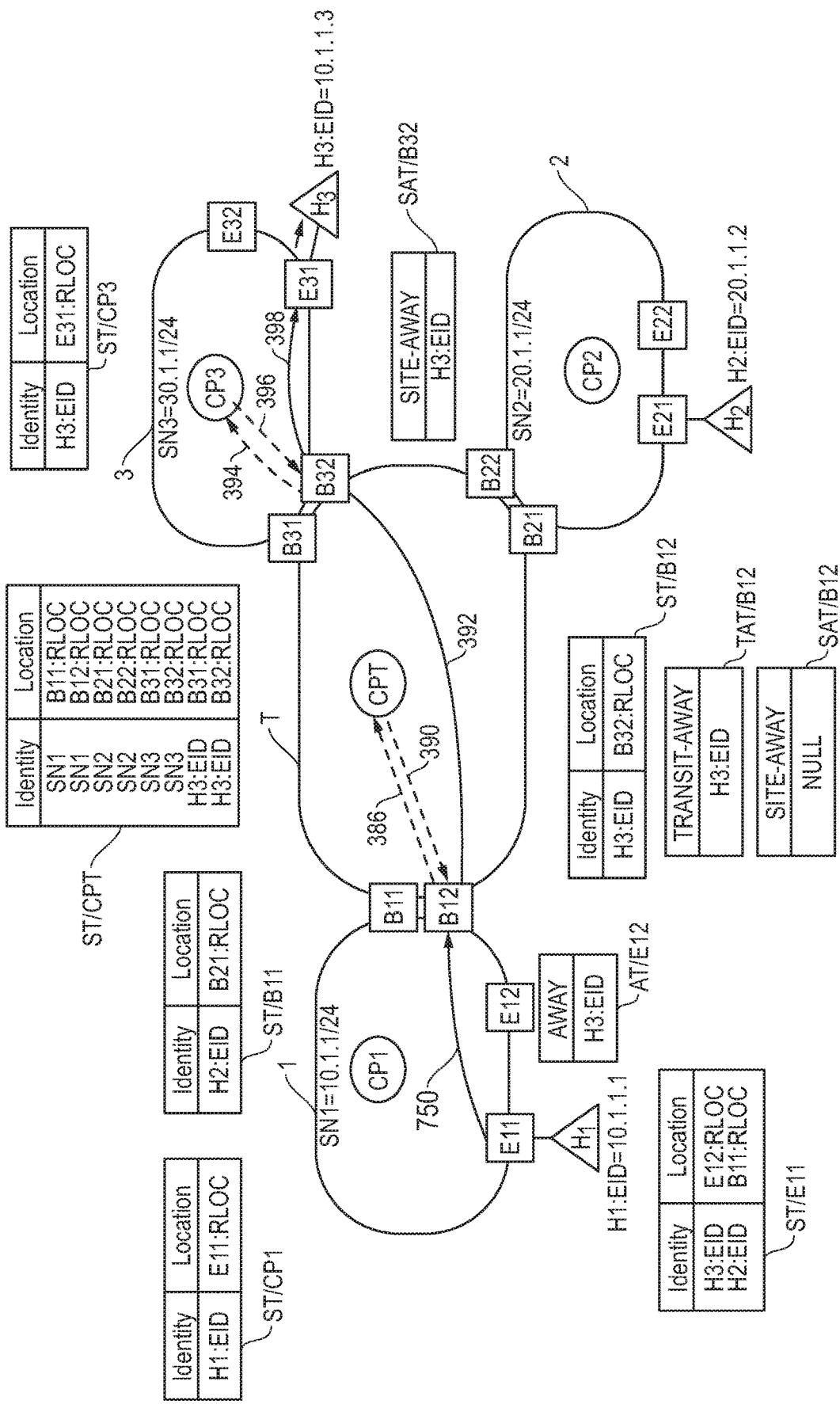
FIG. 1D is a simplified block diagram illustrating relevant aspects of the example SDA fabric.

The method of FIG. 7 is placed into context by considering FIG. 1C, which shows edge node E11 sending an encapsulated data packet along path 740 to edge E12. H3:EID is the destination EID in the IP header of this data packet. Because host H3 has reattached to a foreign fabric site, away table AT/E12 contains H3:EID. In accordance with step 712, E12 sends an SMR to E11 along path 742. E11, in response, sends a map-request for H3:EID to CP1 along path 744. ST/CP1 lacks an entry for H3:EID as shown in FIG. 1C. As such, CP1 sends a negative reply to E11 along path 746. E11 updates its state table ST/E11 in response to the negative reply by mapping H3:EID to B12:RLOC, the RLOC for border node B12. FIG. 1D shows state table ST/E11 after it is updated. Edge node E 11 re-encapsulates the data packet with an outer header having B12:RLOC in the destination field. E11 sends the re-encapsulated data packet towards border node B12 along path 750.

Border nodes forward data packets between hosts, including hosts that have roamed away from their native fabric sites. The site-away and transit-away tables in the border nodes are used to track roaming hosts, and are used to forward data packets to hosts notwithstanding the fact that they have moved to a foreign fabric site. FIGS. 3-5 illustrate alternative embodiments employed by border nodes in response to receiving an encapsulated data packet. These three methods were substantially described above. That description alluded to the ability of the border nodes to forward data packets to visiting hosts using their site-away and/or transit-away tables. The use of these tables are more fully discussed below.

FIG. 1D shows edge node E11 sending an encapsulating data packet to border node B12 along path 750. This packet is destined for host H3, which has reattached to edge node E31. The method in FIG. 3 is implemented in response to a border node B, such as border node B12, receiving an encapsulated data packet. As shown in FIG. 3, when border node B receives an encapsulated data packet, B looks in its transit-away table TAT/B in step 304 to see if the destination EID (D:EID) of the data packet is contained therein. If it is, the process proceeds to step 306 where B sends a map-request to CPT, the T area control plane node. As noted above with respect to FIG. 6, the state table ST/CPT should contain entries that map destination EIDs of visiting hosts to RLOCs of border nodes of fabric sites to which the mobile hosts are now attached. After the CPT receives the map-request sent in step 306, the CPT accesses its state table ST/CPT to find an entry that includes the D:EID. Presuming the entry is found, CPT sends a reply back to node B, which contains a mapping between D:EID, and the RLOC of the B node through which the visiting host can be reached. In step 312, B creates or updates an entry in its state table to map D:EID and the RLOC that was contained within the reply. Thereafter, B removes D:EID from its transit-away table TAT/B.

If the border node B does not find D:EID in its transit-away table, the method proceeds to step 315 where the B node looks in its site-away table SAT/B to see if the D:EID is contained therein. If it is, the method proceeds in similar fashion to the method that is implemented if the destination EID was found in the transit-away table. However, one significant different exists. Rather than sending a map-request to CPT, B sends a map-request to CPx as shown in step 316. This map-request, like the map-request sent in step 304, seeks an RLOC mapped to D:EID. CPx looks in its state table ST/CPx to see if it contains an entry with D:EID. If it does, CPx sends a reply back to node B which includes a mapping between D:EID and an RLOC. B receives the reply and updates its state table by adding an entry that maps D:EID to the RLOC that was contained within the reply from CPx. Then in step 324, B removes D:EID from its site-away table. After implementing step 312 or 324, B re-encapsulates the data packet it received in step 302 with a new outer LISP header that includes the RLOC now mapped to D:EID in ST/B.

To place this into context, as is noted above, border node B12 of FIG. 1D receives an encapsulated data packet from edge node E11 via path 750. The destination EID for this packet (H3:EID) is not contained within this B12's site-away table SAT/B12, but it is contained within its transit-away table TAT/B12. Accordingly, B12 sends a map-request for H3:EID along patch 386 to CPT. The state table ST/CPT, as shown in FIG. 1D, includes a mapping for H3:EID, and as a result, CPT responds to B12 by sending a reply along path 390 that contains a mapping between H3:EID and B32:RLOC, the RLOC of the border node through which host H3 can be reached. B12 removes H3:EID from its transit-away table, and in accordance with step 344 of FIG. 3, B12 re-encapsulates the data packet it received within outer LISP header that includes B32:RLOC. Thereafter, B12 forwards the re-encapsulated back data packet to B32 along patch 392. Although not shown within FIG. 1D, B12 will eventually remove H3:EID from its transit-away table TAT/B12.

Border node B32 of FIG. 1D receives the encapsulated data packet from border node B12 via path 392. H3:EID of the data packet is not contained within this B32's transit-away table TAT/B32, but it is contained within its site-away table SAT/B32. Accordingly, B32 sends a map-request for H3:EID along patch 394 to CP3. The state table ST/CP3, as shown in FIG. 1D, includes a mapping for H3:EID, and as a result, CP3 responds to B32 by sending a reply along path 396 that contains a mapping between H3:EID and E31:RLOC, the RLOC of the edge node to which host H3 is currently attached. B32 re-encapsulates the data packet it received within outer LISP header that includes E31:RLOC. Thereafter, B32 forwards the re-encapsulated back data packet to E31 along patch 398. E31 decapsulates the data packet and forwards it to host H3. Although not shown within FIG. 1D, B32 eventually removes H3:EID from its site-away table.

Figure 8:
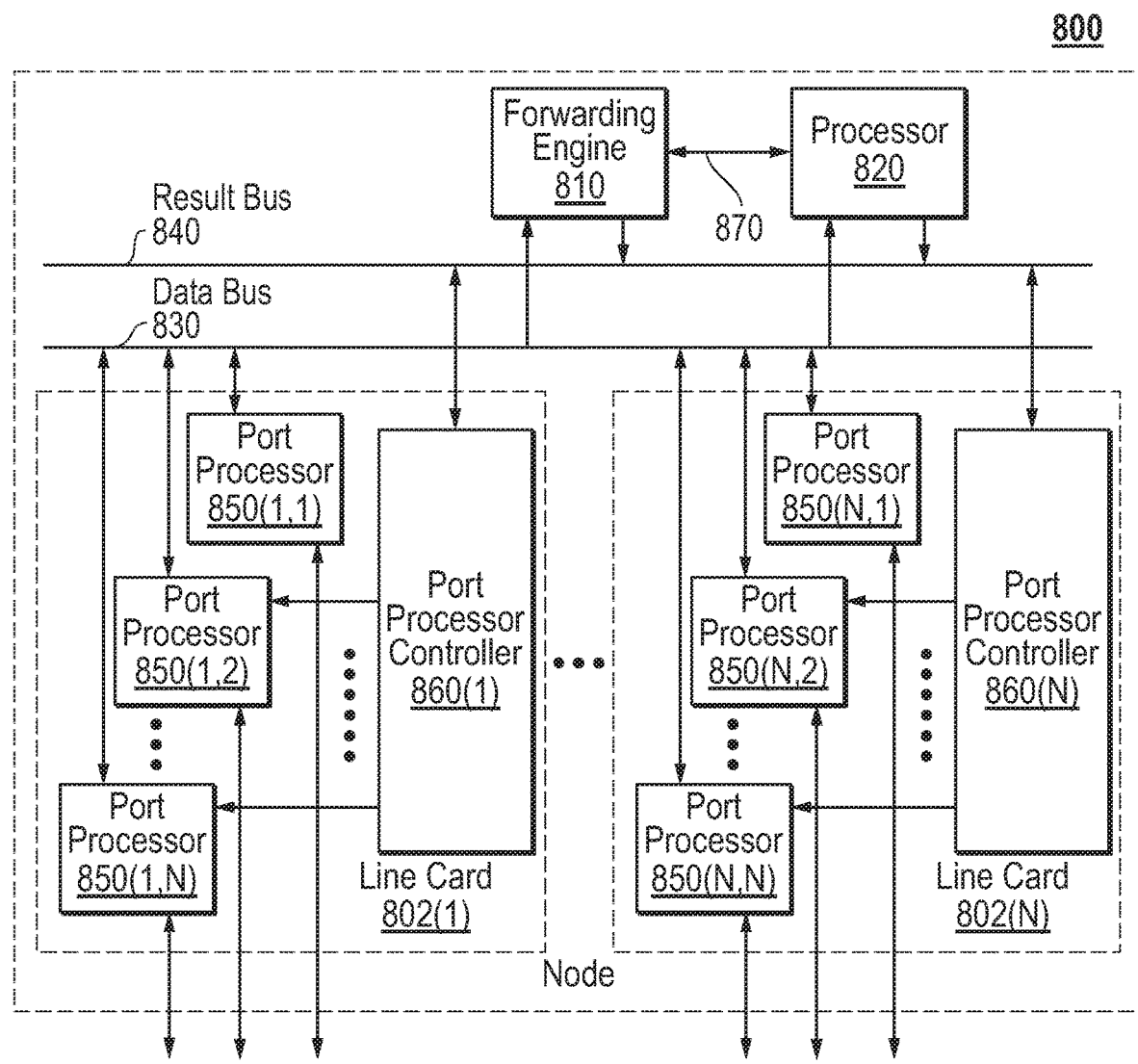
FIG. 8 is a simplified block diagram illustrating certain components of an example node that may be employed in the SDA fabric.

FIG. 8 is a block diagram providing an additional illustration of a device that may act as, or be associated with, a node in SDA fabric 100 described herein. FIG. 8 depicts (at least in part) one configuration of a network device or a network routing element (e.g., a hub, router, switch, or similar device) 800. In this depiction, network device 800 includes a number of line cards (line cards 802(1)-802(N)) that are communicatively coupled to a control module 810 and route processor 820 via a data bus 830 and result bus 840. In an embodiment, line cards 802(1)-802(N), along with data bus 830 and result bus 840, form at least a portion of a network interface. Control module 810 may in an embodiment include engines, modules and data structures for implementing methods of FIGS. 2-7. Line cards 802(1)-(N) include a number of port processors 850(1, 1)-(N, N) which are controlled by port processor controllers 860(1)-(N). Control module 810 and processor 820 are not only coupled to one another via data bus 830 and result bus 840, but are also communicatively coupled to one another by a communications link 870. It is noted that in alternative embodiments, each line card can include its own forwarding engine.

When a message (e.g., data packet, map-registration, etc.) is received at network device 800, the message may be identified and analyzed in the following manner. Upon receipt, a message (or some or all of its information) is sent from the one of port processors 850(1, 1)-(N, N) at which the message was received to one or more of those devices coupled to data bus 830 (e.g., others of port processors 850(1, 1)-(N, N), control module 810 and/or route processor 1220). Handling of the message can be determined, for example, by control module 810. For example, a forwarding engine within control module 810 may determine that the message is to be forwarded to one or more of port processors 850(1, 1)-(N, N). This can be accomplished by indicating to corresponding one(s) of port processor controllers 860(1)-(N) that the copy of the message held in the given one(s) of port processors 850(1,1)-(N,N) is to be forwarded to the appropriate one of port processors 850(1,1)-(N,N). Network devices include one or more processors such as processor 820, which may take the form of, for example, microprocessors, PLDs (Programmable Logic Devices), or ASICs (Application Specific Integrated Circuits). These processors are configured to execute program instructions stored in computer readable storage media of various types, including RAM (Random Access Memory), ROM (Read Only Memory), Flash memory, MEMS (Micro Electro-Mechanical Systems) memory, and the like.

Figure 9:
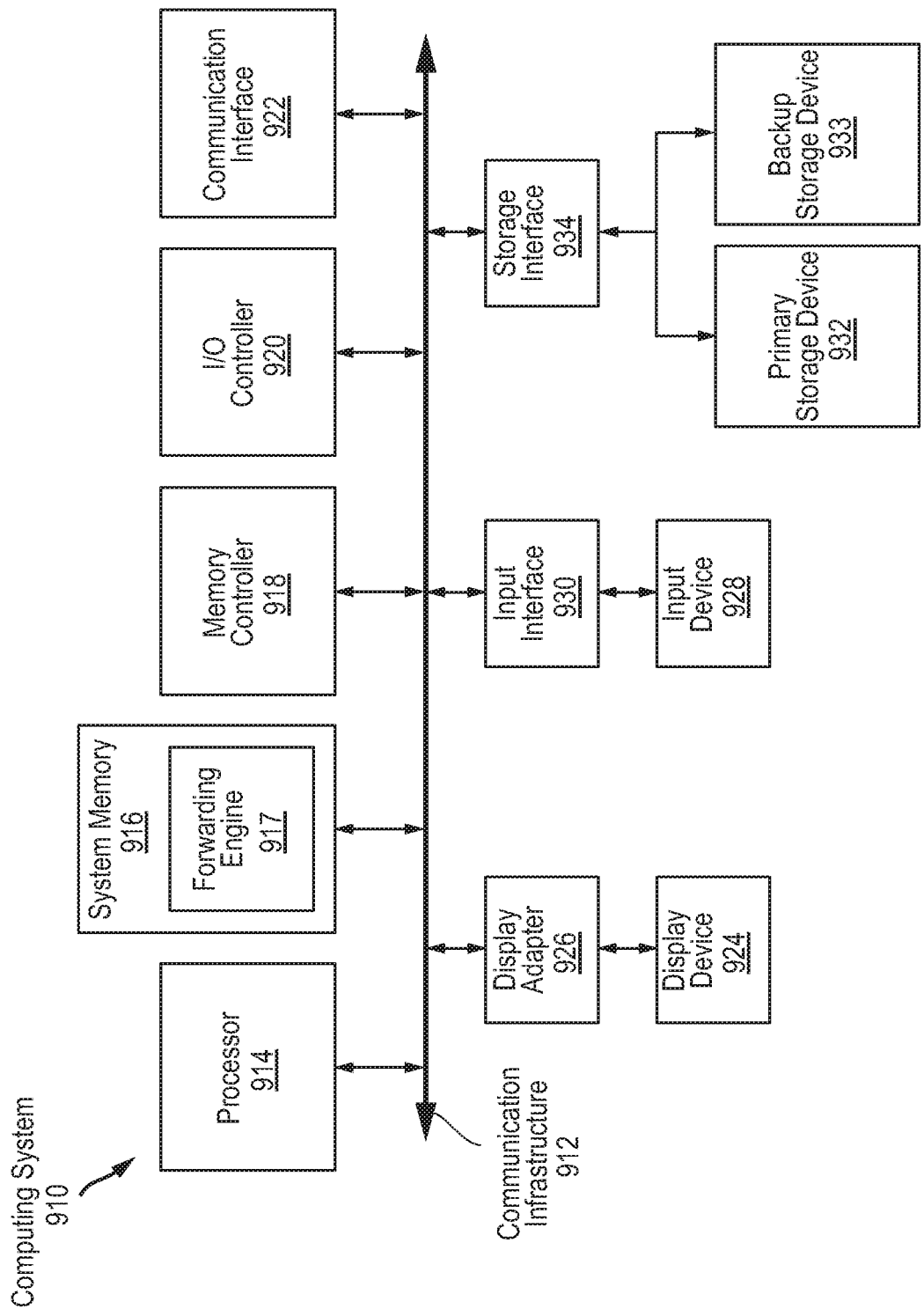
FIG. 9 is a simplified block diagram depicting a computer system suitable for implementing embodiments of the devices and systems described herein.

FIG. 9 depicts a block diagram of a computing system 910 suitable for implementing aspects of the systems and methods described herein. In the embodiment of FIG. 9, computing system 910 implements a forwarding engine 917. Embodiments of the computing system of FIG. 9 can, alternatively or in addition, implement various other engines and modules described in this disclosure. Computing system 910 broadly represents any single or multi-processor computing device or system capable of executing computer-readable instructions. Examples of computing system 910 include, without limitation, any one or more of a variety of devices including workstations, personal computers, laptops, client-side terminals, servers, distributed computing systems, handheld devices (e.g., personal digital assistants and mobile phones), network appliances, switches, routers, storage controllers (e.g., array controllers, tape drive controller, or hard drive controller), and the like. In its most basic configuration, computing system 910 may include at least one processor 914 and a system memory 916. By executing the software that implements a forwarding engine 917, computing system 910 becomes a special purpose computing device that is configured to perform message forwarding in manners described elsewhere in this disclosure.

Processor 914 generally represents any type or form of processing unit capable of processing data or interpreting and executing instructions. In certain embodiments, processor 914 may receive instructions from a software application or module. These instructions may cause processor 914 to perform the functions of one or more of the embodiments described and/or illustrated herein. System memory 916 generally represents any type or form of volatile or non-volatile storage device or medium capable of storing data and/or other computer-readable instructions. Examples of system memory 916 include, without limitation, random access memory (RAM), read only memory (ROM), flash memory, or any other suitable memory device. The ROM or flash memory can contain, among other code, the Basic Input-Output System (BIOS) which controls basic hardware operation such as the interaction with peripheral components. Although not required, in certain embodiments computing system 910 may include both a volatile memory unit (such as, for example, system memory 916) and a non-volatile storage device (such as, for example, primary storage device 932, as described further below). In one example, program instructions executable to implement a forwarding engine configured to forward messages using state and away tables, may be loaded into system memory 916.

In certain embodiments, computing system 910 may also include one or more components or elements in addition to processor 914 and system memory 916. For example, as illustrated in FIG. 9, computing system 910 may include a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an Industry Standard Architecture (ISA), Peripheral Component Interconnect (PCI), PCI express (PCIe), or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912. In certain embodiments, memory controller 918 may perform and/or be a means for performing, either alone or in combination with other elements, one or more of the operations or features described and/or illustrated herein. I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934.

Communication interface 922 broadly represents any type or form of communication device or adapter capable of facilitating communication between computing system 910 and one or more additional devices. For example, in certain embodiments communication interface 922 may facilitate communication between computing system 910 and a private or public network including additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 11054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution.

As illustrated in FIG. 9, computing system 910 may also include at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer) for display on display device 924. Computing system 910 may also include at least one input device 928 coupled to communication infrastructure 912 via an input interface 930. Input device 928 generally represents any type or form of input device capable of providing input, either computer or human generated, to computing system 910. Examples of input device 928 include, without limitation, a keyboard, a pointing device, a speech recognition device, or any other input device.

As illustrated in FIG. 9, computing system 910 may also include a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may include a magnetic disk drive (e.g., a so-called hard drive), a floppy disk drive, a magnetic tape drive, an optical disk drive, a flash drive, or the like. Storage interface 934 generally represents any type or form of interface or device for transferring data between storage devices 932 and 933 and other components of computing system 910. A storage device like primary storage device 932 can store information such as routing tables and forwarding tables.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also include other similar structures or devices for allowing computer software, data, or other computer-readable instructions to be loaded into computing system 910. For example, storage devices 932 and 933 may be configured to read and write software, data, or other computer-readable information. Storage devices 932 and 933 may be a part of computing system 910 or may in some embodiments be separate devices accessed through other interface systems. Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9.

Computing system 910 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 910 for storage in memory via a network such as the Internet or upon a carrier medium. The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the embodiments described and/or illustrated herein. Additionally or alternatively, one or more of the embodiments described and/or illustrated herein may be implemented in firmware and/or hardware. For example, computing system 910 may be configured as an application specific integrated circuit (ASIC) adapted to implement one or more of the embodiments disclosed herein.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   a first border (B) node in a network receiving an encapsulated data packet, wherein the encapsulated data packet comprises an outer header and a data packet, wherein the outer header comprises a first router locator (RLOC) corresponding to the first B node, wherein the data packet comprises an internet protocol (IP) header, wherein the IP header comprises a destination endpoint identification (EID) corresponding to a host H;
   the first B node determining whether the EID is mapped in memory to another RLOC;
   in response to the first B node determining the EID is not mapped in memory to another RLOC, the B node sending a first request to a device in data communication with the first B node;
   the first B node receiving a first reply to the first request, wherein the first reply comprises a second RLOC;
   the first B node re-encapsulating the data packet with a new outer header, wherein the new outer header comprises the second RLOC;
   the first B node forwarding the re-encapsulated data packet towards a B node corresponding to the second RLOC, wherein the B node is in a domain that contains the host H.

2. The method of claim 1 wherein the device comprises a first control plane (CP) node that is contained in a first fabric site that contains the first B node.

3. The method of claim 1 wherein the device comprises a first CP node that is contained in a transit site, wherein the first B node is contained in the transit site and a first fabric site.

4. The method of claim 1 further comprising:
   the first B node sending a second request in response to the first B node determining the EID is not mapped in memory to another RLOC;
   the first node receiving a second reply to the second request, wherein the second reply comprises a third RLOC;
   wherein the first response comprises the EID;
   wherein the second response comprises a prefix covering the EID.

5. The method of claim 1 further comprising:
   the first B node sending a second request in response to the first B node determining the EID is not mapped in memory to another RLOC;
   the first node receiving a second reply to the second request, wherein the second reply lacks a RLOC;
   wherein the first response comprises a prefix covering the EID.

6. The method of claim 1 further comprising an act of mapping the first RLOC to the EID in the memory.

7. The method of claim 1 further comprising:
   the first B node receiving and storing a list of EIDs before the first B node receives the encapsulated data packet.

8. A computer readable memory (CRM) comprising executable instructions, wherein a method is implemented in response to a processor of a first border (B) node executing the instructions, the method comprising:
   receiving an encapsulated data packet, wherein the encapsulated data packet comprises an outer header and a data packet, wherein the outer header comprises a first router locator (RLOC) corresponding to the first B node, wherein the data packet comprises an internet protocol (IP) header, wherein the IP header comprises a destination endpoint identification (EID) corresponding to a host H;
   determining whether the EID is mapped in memory to another RLOC;
   in response to determining the EID is not mapped in memory to another RLOC, sending a first request to a device in data communication with the first B node;
   receiving a first reply to the first request, wherein the first reply comprises a second RLOC;
   re-encapsulating the data packet with a new outer header, wherein the new outer header comprises the second RLOC;
   forwarding the re-encapsulated data packet towards a B node corresponding to the second RLOC, wherein the B node is in a domain that contains the host H.

9. The CRM of claim 8 wherein the device comprises a first control plane (CP) node that is contained in a first fabric site that contains the first B node.

10. The CRM of claim 8 wherein the device comprises a first CP node that is contained in a transit site that is connected to a first fabric site that contains the first B node.

11. The CRM of claim 8 wherein the method further comprises:
    sending a second request in response to determining the EID is not mapped in memory to another RLOC;
    receiving a second reply to the second request, wherein the second reply comprises a third RLOC;
    wherein the first response comprises the EID;
    wherein the second response comprises a prefix covering the EID.

12. The CRM of claim 8 wherein the method further comprises:
    sending a second request in response to determining the EID is not mapped in memory to another RLOC;
    receiving a second reply to the second request, wherein the second reply lacks a RLOC;
    wherein the first response comprises a prefix covering the EID.

13. The CRM of claim 8 wherein the method further comprises mapping the first RLOC to the EID in the memory.

14. The CRM of claim 8 wherein the method further comprises:
    receiving and storing a list of EIDs before the first B node receives the encapsulated data packet.

15. A network node comprising:
    a network interface circuit;
    a memory storing instructions;
    a processor operably coupled to the network interface circuit and configured to execute the instructions stored in the memory, wherein the processor implements a method in response to executing the instructions, the method comprising:
    receiving an encapsulated data packet, wherein the encapsulated data packet comprises an outer header and a data packet, wherein the outer header comprises a first router locator (RLOC) corresponding to the network node, wherein the data packet comprises an internet protocol (IP) header, wherein the IP header comprises a destination endpoint identification (EID) corresponding to a host H;
    determining whether the EID is mapped in memory to another RLOC;
    in response to determining the EID is to mapped in memory to another RLOC, re-encapsulating the data packet with a new outer header, wherein the new outer header comprises the other RLOC;

forwarding the re-encapsulated data packet towards a B node corresponding to the other RLOC, wherein the B node is in a domain that contains the host H.

16. The network node of claim 15 wherein the method further comprises:

receiving a first encapsulated data packet, wherein the first encapsulated data packet comprises a first outer header and a first data packet, wherein the first outer header comprises the first RLOC, wherein the first data packet comprises a first internet protocol (IP) header, wherein the first IP header comprises a first EID corresponding to a first host H;

determining whether the first EID is mapped in memory to another RLOC;

in response to determining the first EID is not mapped in memory to another RLOC, sending a first request to a device in data communication with the network node;

receiving a first reply to the first request, wherein the first reply comprises a second RLOC;

re-encapsulating the first data packet with a new first outer header, wherein the new first outer header comprises the second RLOC;

forwarding the re-encapsulated first data packet towards a node corresponding to the second RLOC.

17. The network node of claim 16 wherein the device comprises a first control plane (CP) node that is contained in a first fabric site that contains the network node.

18. The network node of claim 16 wherein the method further comprises:

sending a second request in response to the network node determining the first EID is not mapped in memory to another RLOC;

receiving a second reply to the second request, wherein the second reply comprises a third RLOC;

wherein the first response comprises the first EID;

wherein the second response comprises a prefix covering the first EID.

19. The network node of claim 16 wherein the method further comprises:

sending a second request in response to the network node determining the first EID is not mapped in memory to another RLOC;

receiving a second reply to the second request, wherein the second reply lacks a RLOC;

wherein the first response comprises a prefix covering the first EID.

* * * * *